United States Patent [19]

Franczyk et al.

[11] 4,319,255

[45] Mar. 9, 1982

[54] TINTED METALLIZED RECORDING MEDIUM

[75] Inventors: John A. Franczyk, Sloan; Willard C. Hamm, Vestal; Russell T. White, Jr., Binghamton, all of N.Y.

[73] Assignee: International Business Machines Corporation, Armonk, N.Y.

[21] Appl. No.: 103,764

[22] Filed: Dec. 14, 1979

[51] Int. Cl.[3] .......... G01D 15/08; H04N 1/22

[52] U.S. Cl. .......... 346/163; 346/135.1; 358/298

[58] Field of Search .......... 358/297, 298, 75; 346/163, 162, 135.1, 76 L, 76 R, 76 PH

[56] References Cited

U.S. PATENT DOCUMENTS

| | | | |
|---|---|---|---|
| 1,825,551 | 9/1931 | Serrell | 346/163 |
| 2,294,643 | 9/1942 | Wuryburg | 358/298 |
| 2,833,677 | 5/1958 | Baumlein | 346/135.1 |
| 3,263,604 | 8/1966 | Dalton | 346/135.1 |
| 3,789,425 | 1/1974 | Matsushima | 346/163 |
| 3,861,952 | 1/1975 | Fokumoto | 346/135.1 |
| 4,014,030 | 3/1977 | Stark | 358/298 |
| 4,081,828 | 3/1978 | Jones | 358/298 |
| 4,082,902 | 4/1978 | Suzuki | 346/135.1 |
| 4,097,637 | 6/1978 | Loria | 346/163 |
| 4,139,856 | 2/1979 | Peterson | 346/163 |
| 4,178,598 | 12/1979 | Erlichman | 358/298 |
| 4,217,596 | 8/1980 | Jung | 346/135.1 |

*Primary Examiner*—James W. Moffitt
*Assistant Examiner*—Alan Faber
*Attorney, Agent, or Firm*—Kenneth P. Johnson

[57] ABSTRACT

Method of coloring the erodible metal surface of a metallized record medium by overprinting discrete limited areas of the surface with one or more inks of preselected colors to provide a distinctive halftone tint to the surface without adversely affecting the recording quality of the medium during subsequent selective removal of the metal coating.

24 Claims, 2 Drawing Figures

TINTED METALLIZED RECORDING MEDIUM

BACKGROUND OF THE INVENTION

This invention relates generally to recording mediums and more particularly to metallized recording mediums in which the metal surface is eroded to expose an underlying layer of contrasting color.

Metallized papers having a thin layer of metal thereon which is erodible by recording electrodes are well known. These papers are usually coated with metal which is sputtered or evaporated over the surface of the paper in an extremely thin layer a several hundred Angstroms in thickness. The metal coating covers either a dark paper or a paper having an intermediate layer which contrasts with the color of the metal coating so that, when exposed, the covered layer provides easily readable marks. The papers may be coated with any of several different metals but the usual metal is aluminum which provides a bright, shiny surface having the silver coloring of the aluminum. There is some reluctance in certain recording applications, to use this record medium because of the brightness of the surface since a dull or matte finish is preferred.

Past attempts at providing muted, more acceptable surface finishes have tried coating with different metals such as zinc, nickel, tin, copper or bronze. (See U.S. Pat. Nos. 1,825,551 and 2,833,677.) Usually the coating of these other metals requires more processing or more expensive metallizers to achieve the coating. These other metals are able to provide some differences in color, but their expense is a significant disadvantage. Another drawback of other metals is the variation in surface resistivity which requires different energies for the recording erosion. This further requires changing the printer marking energy to conform to that necessary to remove coat and is the most attractive of the metallized papers. Heretofore, however, its acceptance has been slow because of the metallic sheen.

Metallized paper has been used heretofore in certain applications such as decorative packaging or labels. In these instances, overprinting of the metal with designs or information may be required. However, there has been no application of ink where the metal coating was intended for removal.

OBJECTS AND SUMMARY OF THE INVENTION

It is accordingly a primary object of this invention to provide a method of coloring metallized record mediums which does not adversely affect recording quality and is applicable to various metal coatings.

Another important object of this invention is to provide a method of providing coated metallized record mediums for erodible recording which dulls the surface finish while maintaining a color approximating the original color of the metal coating.

Yet another object of this invention is to provide a method of coating the metal surface of a metallized record medium with one or more various colors to produce any of a wide variety of hues while yet permitting selective metal removal.

Still another object of this invention is to provide a method of coating the metal layer of a metallized record medium with an opaque coating to dull the surface reflection of the metal while maintaining the original color and permitting erosion of the metal surface.

The foregoing objects of the invention are attained in accordance with the invention by printing the metal surface of metallized record mediums with one or more seleced inks applied by means of conventional tint screens to achieve a halftone printing of the metal surface and restricting the coating to discrete areas which in totality cover a small portion of the surface and which is insufficient to affect the recording ability of the record medium.

The discrete ink marks applied to the metal surface may have various shapes, being spots or lines, which still leave a significant portion of the metal exposed to the recording head for selective removal during printing. The ink colors may be any chosen to provide the desired hue on the surface of the metallized layer and in the event that the original color of the metal layer is desired, a corresponding pigmented ink of the same color can be applied to dull the glossiness of the original metal coating. In addition, two or more screens can be used to apply different colors to achieve a composite hue.

The foregoing and other objects, features and advantages of the invention will be apparent from the following more particular description of preferred embodiments of the invention, as illustrated in the accompanying drawing.

DESCRIPTION OF THE PREFERRED EMBODIMENTS

Figure 1:
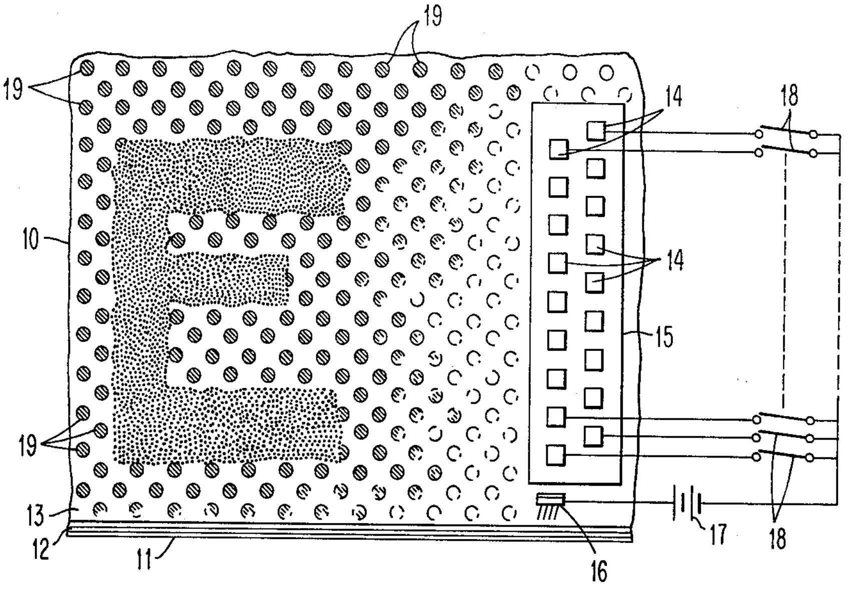
FIG. 1 represents a portion of a metallized recording member having tinting applied to the recording surface thereof in accordance with the principles of the invention.

Referring to FIG. 1, there is shown a portion of a metallized recording member 10, well known in the recording technology, which typically comprises a layer 11 of paper having on its upper surface a coating 12 of a dark material such as ink which, in turn, is coated with a thin metal layer 13 such as evaporated or sputtered aluminum, tin or nickel. Base paper layer 11 may be a dark, homogeneously colored paper thus making coating 12 unnecessary. Recording is accomplished by selectively eroding off the metal by means of electrodes 14 in contact with the metal layer and schematically shown in two parallel rows of a print head 5. The metallized paper surface is connected through a conductive roll or brush 16 to one polarity of voltage source 17, while the recording electrodes are selectively and momentarily connected through switches 18 to the opposite polarity of the potential. A current flow between the selected electrodes 14 and the metal surface 13 is sufficient to vaporize the thin metal layer and expose the underlying dark, contrasting coating. The exposed area approximates that of the electrode end. Characters, such as the illustrated "E", are formed by the sequential, selective energization of various electrodes during relative motion of print head 15 and recording medium 10. Because the character is formed by the vaporization of the metal layer, its edges are not uniform and appear eroded as approximated in the figure.

Most metallized recording mediums use aluminum as the vaporizable surface layer 13 and, hence, have a metallic sheen the color of the aluminum. The result is that the unrecorded areas of the record member appear bright and shiny producing a glare which is distracting, making reading uncomfortable or difficult. In addition, there is very little choice of color since color has heretofore been obtained by using a few different metals to form the surface layer. In accordance with the invention, a choice of color is provided for the thin metallized layer by overprinting the metal with lithographic inks by means of commercially available tinting halftone screens. The metallized record member 10 is thus coated over a limited percentage of its surface with discrete colored areas 19 shown as circular spots in FIG. 1. The fineness of the spots and the integrating reaction of the human eye result in sensing the recording member as having the overall color of the applied inks.

The discrete color areas 19 on the surface of the metal 13 are preferably limited to between 10% and 30% of the total recording surface. When greater portions of the area are coated with the inks, the electrical recording energy required at the recording elements is substantially increased and metal removal cannot be assured. Although the areas coated by ink appear in the character area recorded by the electrode, they are usually removed by the vaporization of the underlying metal layer with the limited coating. Removal of larger portions of the ink coated areas can be accomplished by increasing the potential applied to the recording electrodes. However, an electrode voltage adjustment is required when a recording member has a greater or lesser portion of its surface covered with the tinting.

The porosity of the thin evaporated or sputtered layers of metal over which the tinting is applied is usually sufficient to provide for nearly instantaneous drying of the ink. Supplementary drying or curing steps are not required during overprinting to prevent smearing and special surface preparation is unnecessary. The preferable inks for forming the discrete colored areas are the usual commercial lithographic inks which are not pigmented. However, pigmented inks can be used and the inks may be either electrically conductive or nonconductive. Obviously, when nonconductive inks are used, the vaporizing current flow is not available to the underlying metal layer, but the vaporizing of contiguous metal usually partially erodes that covered by the insulative inks.

Figure 2:
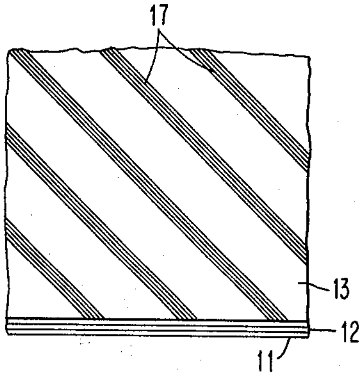
FIG. 2 is a representation of a portion of a recording member having tinting applied to the record surface in an alternative manner, but in accordance with the principles of the invention.

Tinting screens are commercially available in various densities and fineness. As stated above, the densities from 10% to 30% are preferred although other densities may be used, since the resulting recording quality is a subjective matter. It is, of course, further preferable that the finer screens, such as 120 to 150 lines per inch, be used to maintain subsequent recording resolution. Available tinting screens also can be obtained to record the colored areas in various configurations. Although inked areas 19 in FIG. 1 are shown as circular, they may be of any other desired configuration. One possibility is that shown in FIG. 2 in which the tinting is done on layer 13 with straight, diagonal lines 20. The dimensions of the tinting marks should be of a diameter or width less than that of a recording element in order to minimize the effect of any remaining ink coated spot within the character region.

Multiple colors may be applied to the surface of metallized paper to effect a particular composite blend. In addition, the applied color may be similar to the metal surface but of different reflectivity so as to reduce the sheen of the surface.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of recording by selective removal of material comprising the steps of:
- coating one surface of an insulative base material of a first color with a metal layer of a second color;
- overprinting the exposed surface of said metal layer with discrete areas of an ink of a third color to effect a hue on said metal layer; and
- selectively removing via electrodes said metal layer at predetermined locations to expose said base layer of said first color.

2. The method as described in claim 1 wherein said removal step is effected by selective energization of one or more of a plurality of electrodes.

3. The method as described in claim 1 wherein said discrete areas total less than half of the exposed surface of said metal layer.

4. The method as described in claim 1 wherein said discrete areas of ink total between 10% and 30% of the exposed surface area of said metal layer.

5. The method as described in claim 1 wherein said overprinting is a plurality of discrete areas having a regular pattern.

6. The method as described in claim 1 wherein said overprinting of said exposed metal surface comprises at least two steps each with a different color of ink.

7. The method as described in claim 1 wherein said insulative base is paper.

8. The method as described in claim 7 wherein said metal layer is aluminum.

9. The method as described in claim 1 wherein said ink is electrically conductive.

10. The method as described in claim 1 wherein said ink is an insulative material.

11. The method as described in claim 1 wherein said discrete areas are parallel stripes of ink.

12. The method as described in claim 1 wherein said discrete areas are each of less area than the recording surface of each of said electrodes.

13. A record member comprising:
- a base sheet of insulative material having a coating on one surface;
- a selectively removable metal layer overlying said coating; and
- a plurality of discrete areas of ink uniformly overprinted on said metal layer.

14. The record member of claim 13 wherein the colors of said coating, said metal layer and said ink are each different.

15. The record member of claim 13 wherin said metal layer is overprinted in lithographic halftone uniformly covering between 10% and 30% of the surface of said metal layer.

16. The record member of claim 1 wherein said oerprinting is a pattern of parallel stripes of uniform width.

17. The record member of claim 13 wherein said metal layer is overprinted with an electrically conductive ink.

18. The record member of claim 13 wherein said metal layer is overprinted with an electrically insulative ink.

19. The record member of claim 13 wherein said overprinting comprises at least two different colors of ink.

20. A record member comprising:
a base sheet of insulative material;
a selectively removable metal layer overlying one surface of said base sheet; and
a plurality of discrete areas uniformly overprinted with ink on said metal layer covering between 10% and 30% of the surface thereof.

21. The record member of claim 20 wherein said overprinted areas are a halftone pattern.

22. The second member of claim 20 wherein said overprinted areas are parallel stripes.

23. Recording apparatus comprising:
a base sheet of insulative material having a coating on one surface thereof of a first color;
a selectively removable metal layer overlying said coating and being of a second color; and
a plurality of uniformly disposed discrete areas overprinted with ink of a third color on said metal layer.

24. Apparatus as described in claim 23, further comprising means for selectively removing portions of said overprinted metal layer.

* * * * *

UNITED STATES PATENT AND TRADEMARK OFFICE

CERTIFICATE OF CORRECTION

PATENT NO. : 4,319,255

DATED : March 9, 1982

INVENTOR(S) : J. A. Franczyk, et al

It is certified that error appears in the above-identified patent and that said Letters Patent are hereby corrected as shown below:

Claim 16, Column 4, line 64, cancel "1" and insert --13--; cancel "oer" and insert --over--.

Signed and Sealed this

*Eighth* Day of *June 1982*

[SEAL]

*Attest:*

GERALD J. MOSSINGHOFF

*Attesting Officer* *Commissioner of Patents and Trademarks*